(12) United States Patent
Narayanan et al.

(10) Patent No.: US 11,966,360 B2
(45) Date of Patent: Apr. 23, 2024

(54) SYSTEM FOR OPTIMIZED ARCHIVAL USING DATA DETECTION AND CLASSIFICATION MODEL

(71) Applicant: BANK OF AMERICA CORPORATION, Charlotte, NC (US)

(72) Inventors: Ramesh Lakshmi Narayanan, Chennai (IN); Venkata Apparao Alla, Hyderabad (IN); Madhuri Puram, Hyderabad (IN); Kyriacos Iacovou, Bayside, NY (US); Satish Kumar Kommineni, Hyderabad (IN); Sasidhar Purushothaman, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 146 days.

(21) Appl. No.: 17/141,040

(22) Filed: Jan. 4, 2021

(65) Prior Publication Data
US 2022/0214994 A1    Jul. 7, 2022

(51) Int. Cl.
*G06F 17/00*     (2019.01)
*G06F 16/11*     (2019.01)
(Continued)

(52) U.S. Cl.
CPC ............ *G06F 16/113* (2019.01); *G06N 5/04* (2013.01); *G06N 20/00* (2019.01)

(58) Field of Classification Search
CPC .. G06F 16/113; G06F 3/0649; G06F 11/1446; G06N 5/04; G06N 20/00
See application file for complete search history.

(56) References Cited

U.S. PATENT DOCUMENTS 3,327,291 A    6/1967    Lee
5,719,692 A    2/1998    Cohen
(Continued)

OTHER PUBLICATIONS

Z. Cai-Ming and C. Hao-Nan, "Preprocessing Method of Structured Big Data in Human Resource Archives Database," 2020 IEEE International Conference on Industrial Application of Artificial Intelligence (IAAI), 2020, pp. 379-384, doi: 10.1109/IAAI51705.2020.9332880, Dec. 2020.*

(Continued)

*Primary Examiner* — Greta L Robinson
(74) *Attorney, Agent, or Firm* — Moore & Van Allen PLLC; Anup Shrinivasan Lyer

(57) ABSTRACT

Systems, computer program products, and methods are described herein for optimized data archival using data detection and classification model. The present invention is configured to receive information associated with a first data element within a distributed network environment; determine a first data type associated with the first data element; determine one or more archival actions associated with the first data element; determine one or more archival requirements associated with the first data element; determine one or more utilization parameters associated with the first data element; initiate an execution of the one or more archiving actions on the first data element; determine that the one or more archival actions meet the one or more archival requirements associated with the first data element; and execute the one or more archiving actions based on at least determining that the one or more archival actions meet the one or more archival requirements.

18 Claims, 3 Drawing Sheets

(51) Int. Cl.
*G06N 5/04* (2023.01)
*G06N 20/00* (2019.01)

(56) References Cited

U.S. PATENT DOCUMENTS

| | | | |
|---|---|---|---|
| 5,832,467 A | 11/1998 | Wavish | |
| 5,832,468 A | 11/1998 | Miller et al. | |
| 5,963,910 A | 10/1999 | Ulwick | |
| 6,018,619 A | 1/2000 | Allard et al. | |
| 6,112,304 A | 8/2000 | Clawson | |
| 6,507,726 B1 | 1/2003 | Atkinson et al. | |
| 6,523,015 B1 | 2/2003 | Bera et al. | |
| 6,894,972 B1 | 5/2005 | Phaal | |
| 7,155,466 B2* | 12/2006 | Rodriguez | G06F 16/113 709/219 |
| 7,693,877 B1* | 4/2010 | Zasman | G06F 16/185 707/707 |
| 10,289,685 B2* | 5/2019 | Chitiveli | G06F 16/113 |
| 2002/0107712 A1 | 8/2002 | Lam et al. | |
| 2002/0159641 A1 | 10/2002 | Whitney et al. | |
| 2002/0184408 A1 | 12/2002 | Hannigan et al. | |
| 2003/0069869 A1 | 4/2003 | Gronau et al. | |
| 2003/0088425 A1 | 5/2003 | Lam et al. | |
| 2003/0097302 A1 | 5/2003 | Overhultz et al. | |
| 2001/0059966 | 3/2004 | Chan et al. | |
| 2004/0078175 A1 | 4/2004 | Shaw et al. | |
| 2005/0076245 A1 | 4/2005 | Graham et al. | |
| 2005/0090911 A1 | 4/2005 | Ingargiola et al. | |
| 2005/0132052 A1 | 6/2005 | Uttamchandani et al. | |
| 2010/0318500 A1* | 12/2010 | Murphy | G06F 11/1451 707/693 |
| 2014/0095449 A1* | 4/2014 | Marwah | G06F 16/113 707/668 |
| 2015/0134924 A1* | 5/2015 | Gokhale | G06F 16/113 711/162 |
| 2016/0203145 A1* | 7/2016 | Haviv | G06F 11/1448 707/694 |
| 2018/0276256 A1* | 9/2018 | Sarkar | G06K 9/6221 |
| 2019/0068627 A1* | 2/2019 | Thampy | H04W 12/12 |
| 2019/0370229 A1* | 12/2019 | Guo | G06F 16/22 |
| 2021/0004907 A1* | 1/2021 | Hwang | G06N 3/0454 |

OTHER PUBLICATIONS

E. Shang et al., "Research on the Application of Artificial Intelligence and Distributed Parallel Computing in Archives Classification," 2019 IEEE 4th Advanced Information Technology, Electronic and Automation Control Conference, 2019, pp. 1267-1271, doi: 10.1109/IAEAC47372.2019.8997992, Dec. 2019.*

* cited by examiner

SYSTEM FOR OPTIMIZED ARCHIVAL USING DATA DETECTION AND CLASSIFICATION MODEL

FIELD OF THE INVENTION

The present invention embraces a system for optimized data archival using data detection and classification model.

BACKGROUND

Data archiving is the practice of identifying and moving data elements from a network environment into target archives for long term retention. As data grows, archiving data has become an important consideration for entities as part of a robust data management strategy. However, handling data elements for archiving depends on data characteristics such as data type, data format (structured or unstructured), data volume, data patterns, and/or the like. These data characteristics define the type of archiving actions that are required to archive the data element for long term storage and retention. Therefore, there is a need for an archival management system that optimizes the archival strategy using a data detection and classification model to achieve seamless management and transition of data elements from a network environment to target archives for long term retention.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for optimized data archival using data detection and classification model is presented. The system comprising: at least one non-transitory storage device; and at least one processing device coupled to the at least one non-transitory storage device, wherein the at least one processing device is configured to: electronically receive information associated with a first data element within a distributed network environment; determine a first data type associated with the first data element based on at least the information associated with the first data element; determine one or more archival actions associated with the first data element based on at least the first data type; determine one or more archival requirements associated with the first data element; determine one or more utilization parameters associated with the first data element; initiate an execution of the one or more archiving actions on the first data element based on at least the one or more utilization parameters associated with the first data element; determine that the one or more archival actions meet the one or more archival requirements associated with the first data element; and execute the one or more archiving actions based on at least determining that the one or more archival actions meet the one or more archival requirements.

In some embodiments, the at least one processing device is further configured to: retrieve metadata associated with the execution of the one or more archiving actions; and initiate a dashboard report script, wherein the dashboard report script is configured to generate a graphical interface for display on a computing device of a user, wherein the graphical interface comprises the metadata associated with the execution of the one or more archiving actions.

In some embodiments, the at least one processing device is further configured to: electronically receive information associated with one or more data elements within the distributed network environment; electronically receive, from the computing device of the user, the one or more data types associated with the one or more data elements; and generate a training dataset based on at least the information associated with the one or more data elements and the one or more data types.

In some embodiments, the at least one processing device is further configured to: initiate one or more machine learning algorithms on the training dataset; and generate a machine learning model based on at least initiating the one or more machine learning algorithms on the training dataset.

In some embodiments, the at least one processing device is further configured to: electronically receive information associated with the first data element; and classify, using the machine learning model, the first data element into the first data type.

In some embodiments, the at least one processing device is further configured to: determine one or more archival actions associated with the first data element, wherein determining further comprises: determining one or more target archives associated with the first data element based on at least the first data type; and retrieving, from a header portion of the first data element, data security level associated with the first data element.

In some embodiments, wherein the at least one processing device is further configured to: continuously scan the distributed network environment; determine a data usage pattern associated with the first data element based on at least continuously scanning the distributed network environment; and determine one or more utilization parameters associated with the first data element based on at least the data usage pattern.

In some embodiments, the one or more utilization parameters comprises at least an idle time and a minimal disruption time period.

In another aspect, a computer program product for optimized data archival using data detection and classification model is presented. The computer program product comprising a non-transitory computer-readable medium comprising code causing a first apparatus to: electronically receive information associated with a first data element within a distributed network environment; determine a first data type associated with the first data element based on at least the information associated with the first data element; determine one or more archival actions associated with the first data element based on at least the first data type; determine one or more archival requirements associated with the first data element; determine one or more utilization parameters associated with the first data element; initiate an execution of the one or more archiving actions on the first data element based on at least the one or more utilization parameters associated with the first data element; determine that the one or more archival actions meet the one or more archival requirements associated with the first data element; and execute the one or more archiving actions based on at least determining that the one or more archival actions meet the one or more archival requirements.

In yet another aspect, a method for optimized data archival using data detection and classification model is presented. The method comprising: electronically receiving information associated with a first data element within a distributed network environment; determining a first data type associated with the first data element based on at least the information associated with the first data element; determining one or more archival actions associated with the first data element based on at least the first data type; determining one or more archival requirements associated with the first data element; determining one or more utilization parameters associated with the first data element; initiating an execution of the one or more archiving actions on the first data element based on at least the one or more utilization parameters associated with the first data element; determining that the one or more archival actions meet the one or more archival requirements associated with the first data element; and executing the one or more archiving actions based on at least determining that the one or more archival actions meet the one or more archival requirements.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
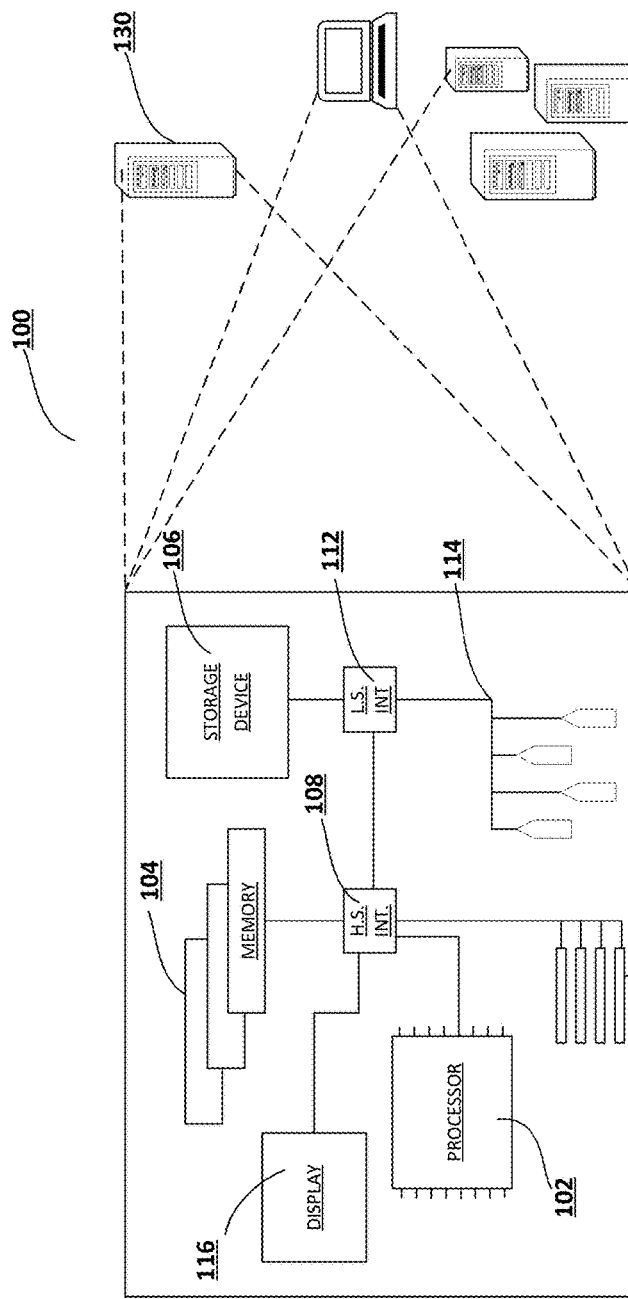
Figure 1:
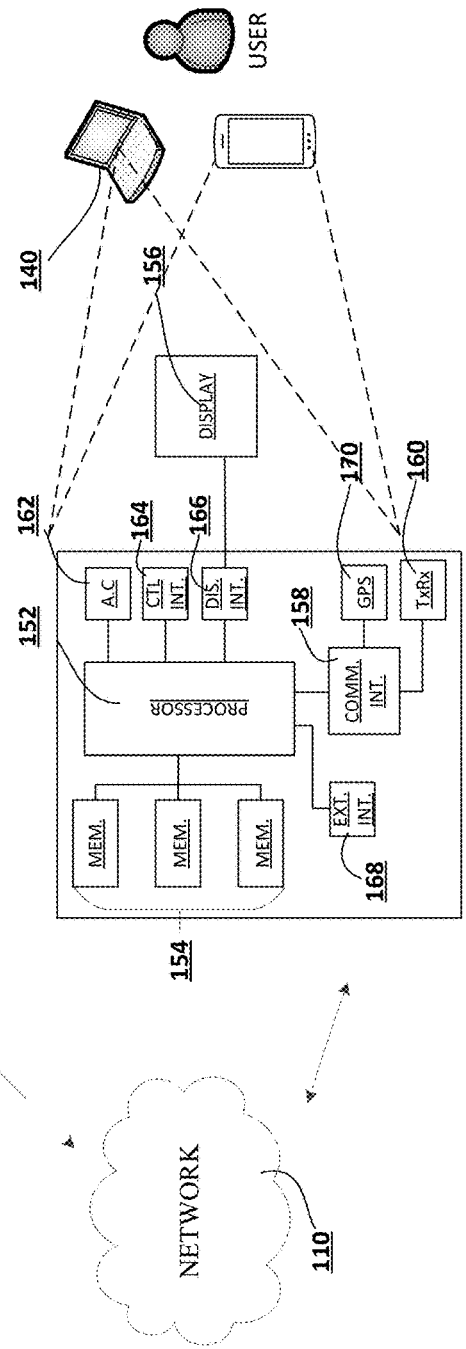
Figure 2:
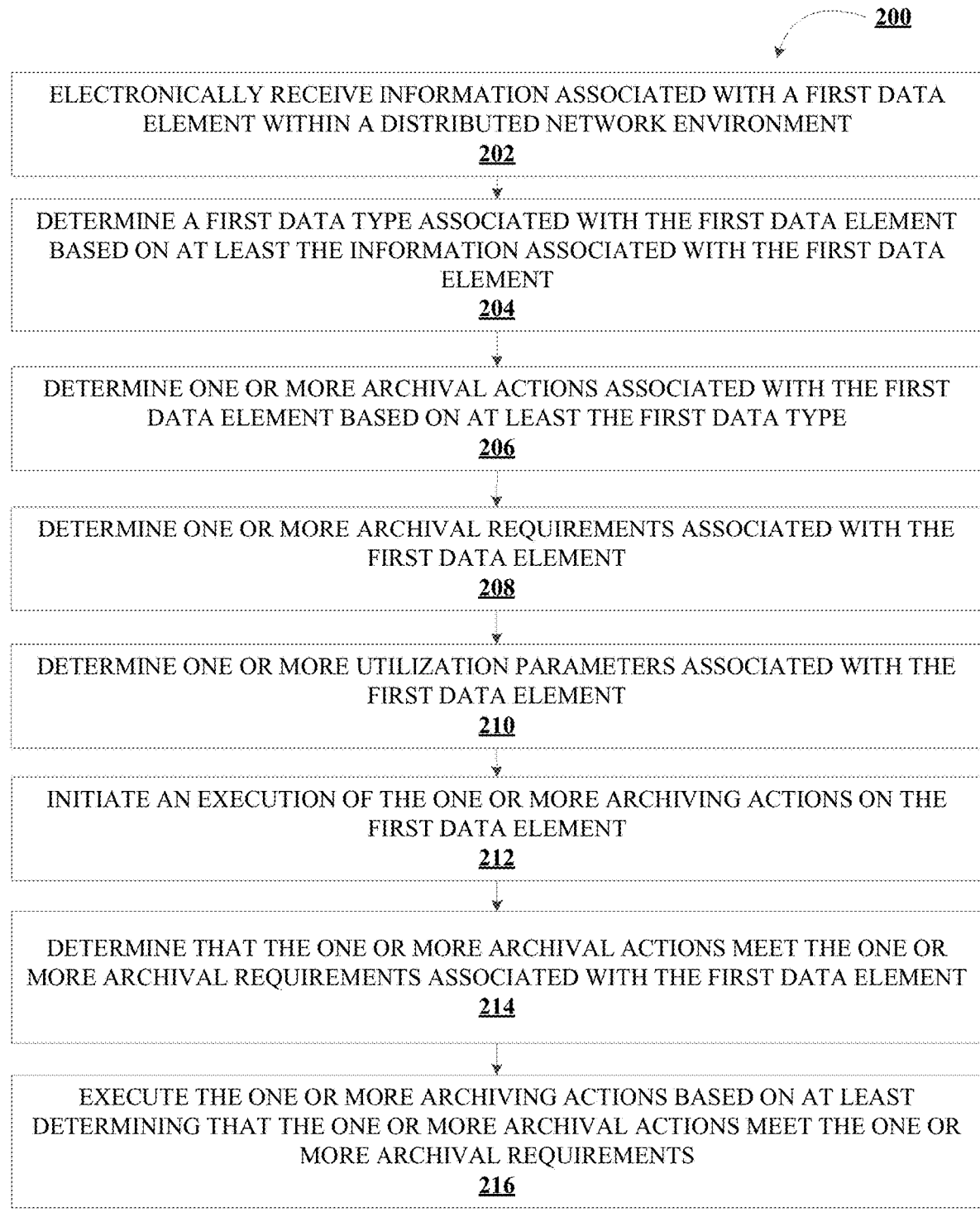
Figure 3:
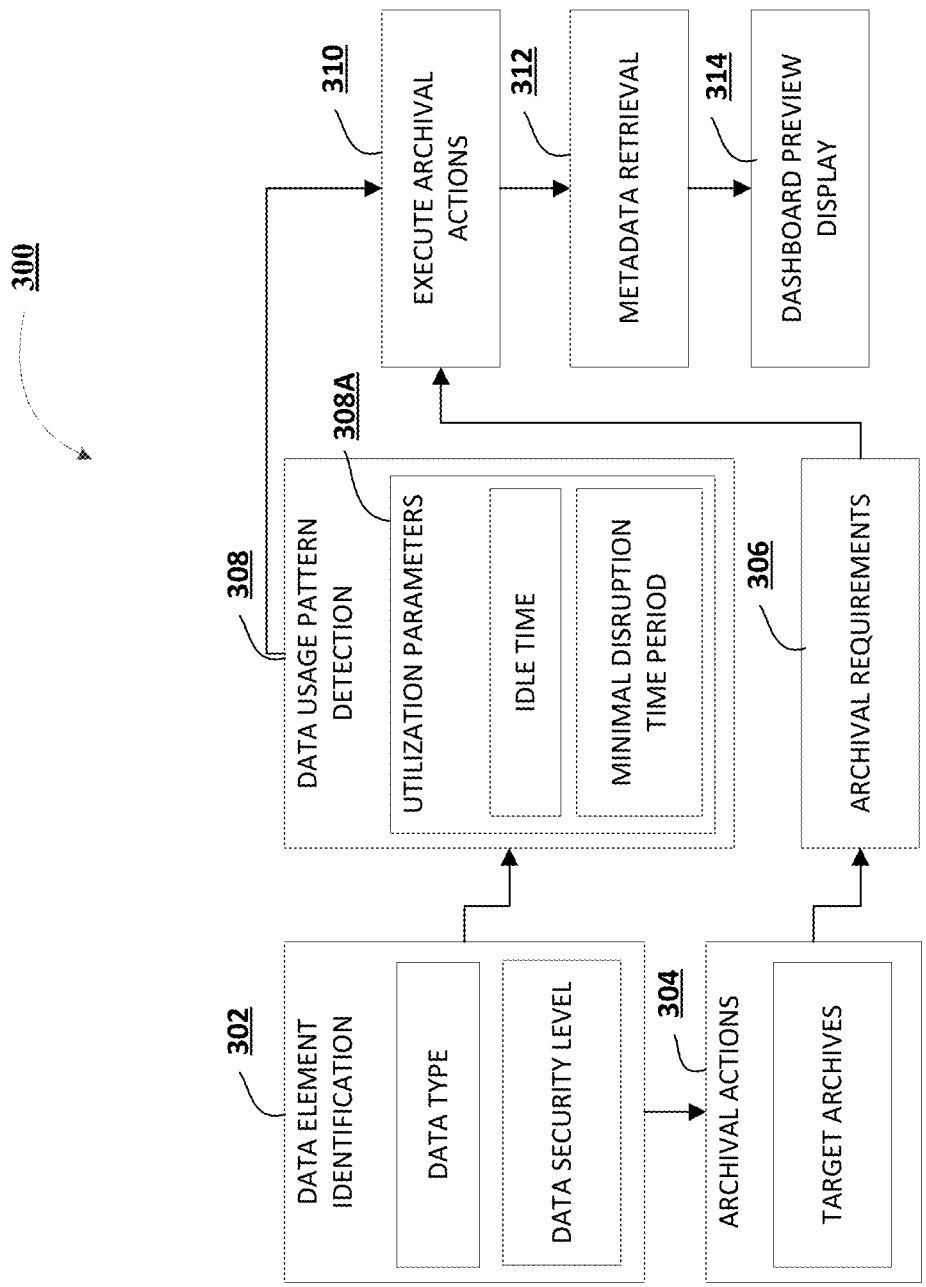

Having thus described embodiments of the invention in general terms, reference will now be made the accompanying drawings, wherein:

FIG. 1 illustrates technical components of a system for optimized data archival using data detection and classification model, in accordance with an embodiment of the invention;

FIG. 2 illustrates a process flow for optimized data archival using data detection and classification model, in accordance with an embodiment of the invention; and FIG. 3 illustrates a data flow diagram for optimized data archival using data detection and classification model, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Data archiving is the practice of identifying and moving data elements from a network environment into target archives for long term retention. As data grows, archiving data has become an important consideration for entities as part of a robust data management strategy. However, handling data elements for archiving depends on data characteristics such as data type, data format (structured or unstructured), data volume, data patterns, and/or the like. These data characteristics define the type of archiving actions that are required to archive the data element for long term storage and retention. Therefore, there is a need for an archival management system that optimizes the archival strategy using a data detection and classification model to achieve seamless management and transition of data elements from a network environment to target archives for long term retention.

The present invention addresses this requirement by implementing a suite of solutions capable of identifying the data type and a corresponding set of archival actions required to archive the data element with minimal load on the network environment. In addition, the present invention allows for continuous monitoring of the network environment to identify specific archival means (timing) for each data element based on the usage pattern of the data element within the network environment. Furthermore, the present invention provides the functional benefit of identifying archival requirements based on the data security level of the data element and ensuring that the archival actions meet the archival requirements. Finally, the present invention allows for a customizable dashboard preview of the archived data for querying, viewing, and interpretation.

FIG. 1 presents an exemplary block diagram of the system environment for optimized data archival using data detection and classification model 100, in accordance with an embodiment of the invention. FIG. 1 provides a unique system that includes specialized servers and system communicably linked across a distributive network of nodes required to perform the functions of the process flows described herein in accordance with embodiments of the present invention. For purposes of the invention, portions of the system environment may also be referred to as a distributed network environment or network environment.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for optimized data archival using data detection and classification model 200, in accordance with an embodiment of the invention. As shown in block 202, the process flow includes electronically receiving information associated with a first data element within a distributed network environment (e.g., system environment 100). In some embodiments, the information associated with the data element may include structural information describing the first data element. In one aspect, the structural information may include a data format in which the first data element is organized, processed, retrieved, and stored, linearity information describing the arrangement of the data records within the first data element (e.g., linear, non-linear, or the like), operational information describing whether the first data element is part of a static dataset or a dynamic dataset, volume information associated with first data element, data range, string patterns, data pattern describing the center, spread, shape, and other features of the first data element, and/or the like.

Next, as shown in block 204, the process flow includes determining a first data type associated with the first data element based on at least the information associated with the first data element. In some embodiments, the system (e.g., system 130) may be configured to implement a data detection and classification model to determine the data type associated with the first data element. In this regard, the system may be configured to electronically receive information associated with one or more data elements within the distributed network environment. Similar to the information associated with the first data element, the information associated with the one or more data elements may include structure information describing each data element. This information may be used to define a feature set where each piece of information is used as a dimensional feature, resulting in a multi-dimensional feature set for each data element.

Having defined the multi-dimensional feature set for each data element, the system may be configured to electronically receive, from a computing device of a user (e.g., user input system 140), the one or more data types associated with the one or more data elements. In some embodiments, data types may be used as classification labels to implement a supervised learning algorithm for training the machine learning model. Next, the system may be configured to generate a training dataset based on at least the information associated with the one or more data elements forming the multi-dimensional feature set and the one or more data types forming the classification labels.

Once the training dataset is generated, the system may be configured to initiate one or more machine learning algorithms on the training dataset. By initiating the machine learning algorithms on the training dataset, the system may be configured to generate a machine learning model. Using this machine learning model, the system may be configured to classify any unseen data element into a specific data type. Accordingly, the system may be configured to electronically receive information associated with the first data element. In response, the system may be configured to classify, using the machine learning model, the first data element into the first data type.

Next, as shown in block 206, the process flow includes determining one or more archival actions associated with the first data element based on at least the first data type. In some embodiments, determining the archival actions may include determining one or more target archives associated with the first data element based on at least the first data type. In one aspect, determining the target archives may include determining the type of storage media (e.g., optical storage, cloud storage, tape drives, portable hard drives, external solid state devices, and/or the like) available for the first data element, determining the type of compression technique to be used during archival, determining the type of data archiving software application to use for the first data element, archival backup requirement for the first data element, and/or the like.

In some other embodiments, the system may be configured to determine the archival actions based on the security level of the first data element. In this regard, the system may be configured to retrieve, from a header portion of the first data element, a data security level associated with the first data element. In one aspect, the data security level may include sensitivity information of the first data element such as restricted, high, medium, and low.

Next, as shown in block 208, the process flow includes determining one or more archival requirements associated with the first data element. In some embodiments, the one or more archival requirements associated with the first data element may include one or more pre-configured conditions for archival of the first data element. In one aspect, the archival requirements may include a specific storage device requirement, a specific data compression requirement, a conditioned archival backup requirement, and/or the like. In some embodiments, the archival requirements may depend on the data security level associated with the first data element.

Next, as shown in block 210, the process flow includes determining one or more utilization parameters associated with the first data element. In some embodiments, the system may be configured to determine a data usage pattern associated with the first data element. In this regard, the system may be configured to continuously scan the distributed network environment to retrieve instances of data usage of the first data element for a predetermined period of time. In one aspect, the system may be configured to identify specific hardware, software, and network components within the network environment that are accessing the first data element during the predetermined period of time. In addition, the system may be configured to determine the rate at which the first data element is being accessed by the hardware, software, and network components. Based on the retrieved instances of data usage, the system may be configured to determine the utilization parameters for the first data element that may be used as archival triggers.

In some embodiments, the utilization parameters may include at least an idle time and a minimal disruption time period. In one aspect, the idle time may be defined as the amount of time the first data element remains dormant in a specific storage location within network environment before the first data element is accessed by the hardware, software, and network components. In some embodiments, the system may be configured to determine the idle time for the first data element at every storage location within the network environment before the first data element is accessed by the hardware, software, and network components. In another aspect, the system may be configured to determine a minimal disruption time period for the first data element to trigger the archival action to ensure least disruption for the network environment.

Next, as shown in block 212, the process flow includes initiating an execution of the one or more archiving actions on the first data element based on at least the one or more utilization parameters associated with the first data element. By initiating the execution of the archiving actions based on the idle time and the minimal disruption time period, the system may be configured to ensure seamless retrieval of the first data element from the network environment for transfer to the target archives. By monitoring the data usage pattern to identify a specific time frame for first data element retrieval, the system may be configured to reduce the amount of computing resources required to successfully execute the archival actions.

Next, as shown in block 214, the process flow includes determining that the one or more archival actions meet the one or more archival requirements associated with the first data element. In some embodiments, the system may be configured to compare each archival action with a corresponding archival requirement to determine whether the archival action meets the archival requirement. In cases where the archival action does not meet the archival requirement, the system may be configured to transmit control signals configured to cause the computing device of the user to display an alert notification indicating as such. In response, the system may be configured to electronically receive, from the computing device of the user, one or more user inputs to reconfigure the one or more archival actions that previously did not meet the archival requirements. In response to receiving the user inputs, the system may be configured to determine whether the reconfigured archival action meets the archival requirement. The step of reconfiguring the archival actions based on the user input is done repeatedly until the archival action meets the archival requirements.

Next, as shown in block 216, the process flow includes executing the one or more archiving actions based on at least determining that the one or more archival actions meet the one or more archival requirements. In some embodiments, executing the one or more archiving actions may include moving the first data element into the one or more target archives for long-term storage and retention. In one aspect, by executing the archiving actions based on the idle time and the minimal disruption time period, the system may be configured to ensure seamless retrieval of the first data element from the network environment and transfer to the target archives.

In some embodiments, the system may be configured to generate a snapshot of the archived data elements. In this regard, the system may be configured to retrieve metadata associated with the execution of the one or more archiving actions. In response, the system may be configured to generate a dashboard report script to generate a graphical interface for display on a computing device of a user. The graphical interface may include information associated with the first data element and the metadata associated with the execution of the one or more archiving actions. When the user wishes to de-archive the first data element, the user may view the snapshot of archival actions executed on the first data element before initiating de-archival actions.

FIG. 3 illustrates a data flow diagram for optimized data archival using data detection and classification model 300, in accordance with an embodiment of the invention. At step 302, the system implements a data element identification engine to determine the data type and the data security level of the first data element. At step 304, the system implements the archival actions engine to determine the archival actions to be executed on the first data element based on the data type and data security level to transfer the first data element to the target archives. At step 306, the system determines the archival requirements that need to be met when executing the archival actions. At step 308, the system implements the data usage pattern detection engine to scan the network environment and determine utilization parameters 308A such as idle time and minimal disruption period. At step 310, the system executes the archival actions. At step 312, in response to executing the archival actions, the system initiates a metadata retrieval engine to retrieve metadata associated with the archival actions executed on the first data element. At step 314, the system initiates a dashboard preview display engine to generate a snapshot of the archived data elements, which includes information associated with the data elements that were archived and the corresponding metadata associated with the archival actions executed when archiving the data elements.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for optimized data archival using data detection and classification model, the system comprising:
   at least one non-transitory storage device; and
   at least one processing device coupled to the at least one non-transitory storage device, wherein the at least one processing device is configured to:
      electronically receive information associated with a first data element within a distributed network environment;
      determine a first data type associated with the first data element based on at least the information associated with the first data element;
      determine a data security level associated with the first data element;
      determine one or more archival actions associated with the first data element based on at least the first data type and the data security level, wherein the one or more archival actions comprises at least a storage device requirement, a data compression requirement, and/or a conditioned archival backup requirement;
      determine one or more archival requirements associated with the first data element;
      determine one or more utilization parameters associated with the first data element, wherein the one or more utilization parameters comprises at least amount of time the first data element has remained dormant in each storage location within the distributed network environment before being accessed by a hardware component, a software component, or a network component and a minimal disruption time period defining a time frame for execution of the one or more archival actions;
      trigger an execution of the one or more archiving actions on the first data element based on at least the one or more utilization parameters associated with the first data elements;
      determine that the one or more archival actions meet the one or more archival requirements associated with the first data element; and
      execute the one or more archiving actions based on at least determining that the one or more archival actions meet the one or more archival requirements.

2. The system of claim 1, wherein the at least one processing device is further configured to:
   retrieve metadata associated with the execution of the one or more archiving actions; and
   initiate a dashboard report script, wherein the dashboard report script is configured to generate a graphical interface for display on a computing device of a user, wherein the graphical interface comprises the metadata associated with the execution of the one or more archiving actions.

3. The system of claim 2, wherein the at least one processing device is further configured to:
   electronically receive information associated with one or more data elements within the distributed network environment;
   electronically receive, from the computing device of the user, the one or more data types associated with the one or more data elements; and
   generate a training dataset based on at least the information associated with the one or more data elements and the one or more data types.

4. The system of claim 3, wherein the at least one processing device is further configured to:
   initiate one or more machine learning algorithms on the training dataset; and
   generate a machine learning model based on at least initiating the one or more machine learning algorithms on the training dataset.

5. The system of claim 4, wherein the at least one processing device is further configured to:
   electronically receive information associated with the first data element; and
   classify, using the machine learning model, the first data element into the first data type.

6. The system of claim 1, wherein the at least one processing device is further configured to:
   determine one or more archival actions associated with the first data element, wherein determining further comprises:
      determining one or more target archives associated with the first data element based on at least the first data type; and
      retrieving, from a header portion of the first data element, the data security level associated with the first data element.

7. The system of claim 1, wherein the at least one processing device is further configured to:
   continuously scan the distributed network environment;
   determine a data usage pattern associated with the first data element based on at least continuously scanning the distributed network environment; and
   determine one or more utilization parameters associated with the first data element based on at least the data usage pattern.

8. A computer program product for optimized data archival using data detection and classification model, the computer program product comprising a non-transitory computer-readable medium comprising code causing a first apparatus to:
   electronically receive information associated with a first data element within a distributed network environment;
   determine a first data type associated with the first data element based on at least the information associated with the first data element;
   determine a data security level associated with the first data element;
   determine one or more archival actions associated with the first data element based on at least the first data type and the data security level, wherein the one or more archival actions comprises at least a storage device requirement, a data compression requirement, and/or a conditioned archival backup requirement;
   determine one or more archival requirements associated with the first data element;
   determine one or more utilization parameters associated with the first data element, wherein the one or more utilization parameters comprises at least amount of time the first data element has remained dormant in each storage location within the distributed network environment before being accessed by a hardware component, a software component, or a network component and a minimal disruption time period defining a time frame for execution of the one or more archival actions;
   trigger an execution of the one or more archiving actions on the first data element based on at least the one or more utilization parameters associated with the first data elements;

determine that the one or more archival actions meet the one or more archival requirements associated with the first data element; and execute the one or more archiving actions based on at least determining that the one or more archival actions meet the one or more archival requirements.

9. The computer program product of claim 8, wherein the non-transitory computer-readable medium comprising code causes the first apparatus to:

retrieve metadata associated with the execution of the one or more archiving actions; and initiate a dashboard report script, wherein the dashboard report script is configured to generate a graphical interface for display on a computing device of a user, wherein the graphical interface comprises the metadata associated with the execution of the one or more archiving actions.

10. The computer program product of claim 9, wherein the non-transitory computer-readable medium comprising code causes the first apparatus to:

electronically receive information associated with one or more data elements within the distributed network environment;

electronically receive, from the computing device of the user, the one or more data types associated with the one or more data elements; and generate a training dataset based on at least the information associated with the one or more data elements and the one or more data types.

11. The computer program product of claim 10, wherein the non-transitory computer-readable medium comprising code causes the first apparatus to:

initiate one or more machine learning algorithms on the training dataset; and generate a machine learning model based on at least initiating the one or more machine learning algorithms on the training dataset.

12. The computer program product of claim 11, wherein the non-transitory computer-readable medium comprising code causes the first apparatus to:

electronically receive information associated with the first data element; and classify, using the machine learning model, the first data element into the first data type.

13. The computer program product of claim 8, wherein the non-transitory computer-readable medium comprising code causes the first apparatus to:

determine one or more archival actions associated with the first data element, wherein determining further comprises:

determining one or more target archives associated with the first data element based on at least the first data type; and retrieving, from a header portion of the first data element, the data security level associated with the first data element.

14. The computer program product of claim 8, wherein the non-transitory computer-readable medium comprising code causes the first apparatus to:

continuously scan the distributed network environment;

determine a data usage pattern associated with the first data element based on at least continuously scanning the distributed network environment; and determine one or more utilization parameters associated with the first data element based on at least the data usage pattern.

15. A method for optimized data archival using data detection and classification model, the method comprising:

electronically receiving information associated with a first data element within a distributed network environment;

determining a first data type associated with the first data element based on at least the information associated with the first data element;

determining a data security level associated with the first data element;

determining one or more archival actions associated with the first data element based on at least the first data type and the data security level, wherein the one or more archival actions comprises at least a storage device requirement, a data compression requirement, and/or a conditioned archival backup requirement;

determining one or more archival requirements associated with the first data element;

determining one or more utilization parameters associated with the first data element, wherein the one or more utilization parameters comprises at least amount of time the first data element has remained dormant in each storage location within the distributed network environment before being accessed by a hardware component, a software component, or a network component and a minimal disruption time period defining a time frame for execution of the one or more archival actions;

triggering an execution of the one or more archiving actions on the first data element based on at least the one or more utilization parameters associated with the first data elements;

determining that the one or more archival actions meet the one or more archival requirements associated with the first data element; and executing the one or more archiving actions based on at least determining that the one or more archival actions meet the one or more archival requirements.

16. The method of claim 15, wherein the method further comprises:

retrieving metadata associated with the execution of the one or more archiving actions; and initiating a dashboard report script, wherein the dashboard report script is configured to generate a graphical interface for display on a computing device of a user, wherein the graphical interface comprises the metadata associated with the execution of the one or more archiving actions.

17. The method of claim 16, wherein the method further comprises:

electronically receiving information associated with one or more data elements within the distributed network environment;

electronically receiving, from the computing device of the user, the one or more data types associated with the one or more data elements; and generate a training dataset based on at least the information associated with the one or more data elements and the one or more data types.

18. The method of claim 17, wherein the method further comprises:

initiating one or more machine learning algorithms on the training dataset; and generating a machine learning model based on at least initiating the one or more machine learning algorithms on the training dataset.

* * * * *